US012536439B2

(12) United States Patent
Borgeaud Dit Avocat et al.

(10) Patent No.: US 12,536,439 B2
(45) Date of Patent: Jan. 27, 2026

(54) LARGE SCALE RETRIEVAL FOR SEQUENCE GENERATION

(71) Applicant: DeepMind Technologies Limited, London (GB)

(72) Inventors: Sebastian Borgeaud Dit Avocat, London (GB); Laurent Sifre, Paris (FR); Arthur Mensch, Paris (FR); Jordan Hoffmann, London (GB)

(73) Assignee: GDM Holding LLC, Mountain View, CA (US)

( * ) Notice: Subject to any disclaimer, the term of this patent is extended or adjusted under 35 U.S.C. 154(b) by 654 days.

(21) Appl. No.: 18/076,984

(22) Filed: Dec. 7, 2022

(65) Prior Publication Data
US 2023/0177334 A1   Jun. 8, 2023

Related U.S. Application Data

(60) Provisional application No. 63/286,892, filed on Dec. 7, 2021.

(51) Int. Cl.
*G06N 3/08* (2023.01)
(52) U.S. Cl.
CPC .................................... *G06N 3/08* (2013.01)
(58) Field of Classification Search
CPC .... G06F 40/216; G06F 40/279; G06F 40/166; G06F 40/30; G06F 40/117; G06F 40/20;
(Continued)

(56) References Cited

U.S. PATENT DOCUMENTS 10,134,425 B1 * 11/2018 Johnson, Jr. ............ G10L 25/87
10,706,873 B2 * 7/2020 Tsiartas ............... G10L 15/1822
(Continued)

FOREIGN PATENT DOCUMENTS

CN   111539199 B   *   8/2023   ............ G06F 40/232
CN   116595881 A   *   8/2023   ............. G06F 30/27
(Continued)

OTHER PUBLICATIONS

Office Action in European Appln. No. 22830749.2, dated Jun. 17, 2025, 13 pages.
(Continued)

*Primary Examiner* — Mohammad K Islam
(74) *Attorney, Agent, or Firm* — Fish & Richardson P.C.

(57) ABSTRACT

Methods, systems, and apparatus, including computer programs encoded on a computer storage medium, for generating a final output sequence. In one aspect, a method comprises: receiving a current output sequence comprising one or more current output segments; receiving a set of reference segments and a respective reference segment embedding of each reference segment that has been generated using an embedding neural network; for each current output segment: processing the current output segment using the embedding neural network to generate a current output segment embedding of the current output segment; and selecting k most similar reference segments to the current output segment using the reference segment embeddings and the current output segment embedding; and processing the current output sequence and the k most similar reference segments for each current output segment to generate an additional output segment that follows the current output sequence in the final output sequence.

21 Claims, 5 Drawing Sheets

(58) Field of Classification Search
CPC ......... G10L 15/02; G10L 15/16; G10L 15/22;
G10L 25/21; G10L 25/84; G06N 3/04;
G06N 3/08; G06N 3/45; G06N 3/084
See application file for complete search history.

(56) References Cited

U.S. PATENT DOCUMENTS

| | | | | |
|---|---|---|---|---|
| 11,003,568 | B2* | 5/2021 | Smith | G06F 11/0793 |
| 11,037,330 | B2* | 6/2021 | Bar-On | G06T 9/002 |
| 2015/0058004 | A1* | 2/2015 | Dimitriadis | G10L 25/78 |
| | | | | 704/233 |
| 2015/0242747 | A1* | 8/2015 | Packes | G06N 3/045 |
| | | | | 706/17 |
| 2016/0163310 | A1* | 6/2016 | Lee | G10L 15/19 |
| | | | | 704/232 |
| 2016/0284347 | A1* | 9/2016 | Sainath | G10L 15/16 |
| 2016/0379632 | A1* | 12/2016 | Hoffmeister | G10L 25/87 |
| | | | | 704/253 |
| 2017/0032244 | A1* | 2/2017 | Kurata | G06N 3/084 |
| 2017/0092268 | A1* | 3/2017 | Kristjansson | G10L 15/16 |
| 2017/0162194 | A1* | 6/2017 | Nesta | G10L 25/30 |
| 2017/0270919 | A1* | 9/2017 | Parthasarathi | G10L 17/06 |
| 2019/0051290 | A1* | 2/2019 | Li | G10L 15/063 |
| 2019/0378010 | A1* | 12/2019 | Morris | G06Q 20/389 |
| 2019/0378498 | A1* | 12/2019 | Sainath | G06N 3/084 |
| 2020/0090682 | A1* | 3/2020 | Liu | G06N 3/08 |
| 2020/0251183 | A1* | 8/2020 | Kashefhaghighi | G16B 40/00 |
| 2020/0334538 | A1* | 10/2020 | Meng | G10L 15/16 |
| 2020/0334539 | A1* | 10/2020 | Wang | G06N 20/20 |
| 2021/0012200 | A1* | 1/2021 | Lyske | G06V 10/82 |
| 2021/0142177 | A1* | 5/2021 | Mallya | G06N 3/084 |
| 2021/0201003 | A1* | 7/2021 | Banerjee | G06V 10/82 |
| 2022/0013105 | A1* | 1/2022 | Sharma | G06N 3/045 |
| 2022/0122590 | A1* | 4/2022 | Haidar | G10L 15/16 |
| 2023/0138491 | A1* | 5/2023 | Semenov | G06N 3/08 |
| | | | | 382/176 |
| 2023/0401831 | A1* | 12/2023 | Krishnan | G06V 10/7747 |
| 2024/0127067 | A1* | 4/2024 | Bair | G06N 3/084 |
| 2024/0127806 | A1* | 4/2024 | Jordan | G06N 3/08 |

FOREIGN PATENT DOCUMENTS

| | | | | |
|---|---|---|---|---|
| KR | 102609719 B1 * | 12/2023 | | G06N 5/02 |
| WO | WO-2024019878 A1 * | 1/2024 | | G10L 15/16 |

OTHER PUBLICATIONS

Dai et al., "Transformer-XL: Attentive Language Models Beyond a Fixed-Length Context," CoRR, Jan. 9, 2019, arXiv:1901.02860, 20 pages.

Devlin, et al., "BERT: Pre-training of Deep Bidirectional Transformers for Language Understanding," CoRR, Oct. 11, 2018, arXiv:1810.04805v2, 16 pages.

International Search Report and Written Opinion in International Appln. No. PCT/EP2022/084592, dated Feb. 28, 2023, 22 pages.

Khandelwal et al., "Nearest neighbor machine translation," CoRR, Oct. 2, 2020, arXiv:2010.00710v1, 14 pages.

Liu et al., "What makes good in-context exampled for GPT-3?," CoRR, Jan. 17, 2021, arXiv:2101.06804v1, 12 pages.

Vaswan et al., "Attention is all you need," 31st Conference on Neural Information Processing Systems, Jun. 12, 2017, 15 pages.

International Preliminary Report on Patentability in International Appln. No. PCT/EP2022/084592, dated Jun. 5, 2024, 16 pages.

* cited by examiner

LARGE SCALE RETRIEVAL FOR SEQUENCE GENERATION

CROSS-REFERENCE TO RELATED APPLICATION

This application claims priority to U.S. Provisional Application No. 63/286,892, filed on Dec. 7, 2021. The disclosure of the prior application is considered part of and is incorporated by reference in the disclosure of this application.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that generates an output sequence conditioned on an input sequence and k most similar reference segments for each of one or more input segments in the input sequence.

According to a first aspect there is provided a method performed by one or more computers and for generating a final output sequence, the method comprising: receiving a network input; receiving a current output sequence comprising one or more current output segments; receiving a set of reference segments and, for each reference segment in the set, a respective reference segment embedding of the reference segment that has been generated from the reference segment using an embedding neural network; for each of the one or more current output segments in the current output sequence: processing the current output segment using the embedding neural network to generate a current output segment embedding of the current output segment; and selecting k most similar reference segments from the set of reference segments to the respective current output segment using the respective reference segment embeddings and the current output segment embedding; and processing the network input, the current output sequence, and the k most similar reference segments for each of the one or more current output segments of the current output sequence using a decoder neural network to generate an additional output segment that follows the current output sequence in the final output sequence.

In some implementations, the network input comprises an input sequence, and the method further comprises: processing the input sequence using an encoder neural network to generate an encoded representation of the input sequence, and processing the current output sequence and the k most similar reference segments for each of the one or more current output segments using the decoder neural network comprises: processing the current output sequence, the k most similar reference segments for each of the one or more current output segments, and the encoded representation of the input sequence.

In some implementations, the network input comprises one or more prompt segments that are provided as input by a user, and current output sequence is updated to include the one or more prompt segments.

In some implementations, the additional output segment of the final output sequence comprises one or more output tokens.

In some implementations, the decoder neural network autoregressively generates each output token of the additional output segment conditioned on the current output sequence, the k most similar segments of each current output segment, and any output tokens in the additional output segment that precede the output token by processing a combined sequence that comprises at least a concatenation of the current output sequence and the preceding output tokens using a sequence of attention blocks.

In some implementations, each of one or more of the attention blocks in the sequence of attention blocks comprises a respective cross-attention neural network layer that applies cross-attention with queries derived from at least the current output segments and keys and values derived from at least the k most similar reference segments for each current output segment.

In some implementations, applying cross-attention with queries derived from at least the current output segments and keys and values derived from at least the k most similar reference segments for each current output segment comprises: for each current output segment in the current output sequence, applying cross-attention with queries derived from at least the current output segment and keys and values derived from at least the k most similar reference segments for each current output segment.

In some implementations, applying cross-attention with queries derived from at least the current output segments and keys and values derived from at least the k most similar reference segments for each current output segment comprises: for the first current output segment in the current output sequence, passing (through the attention block, in particular through the cross-attention neural network layer) a representation of the first current output segment received by the cross-attention neural network layer unaltered; and for each current output segment in the current output sequence after the first current output segment, applying cross-attention with queries derived from at least the current output segment and keys and values derived from at least the k most similar reference segments for the previous current output segment in the current output sequence immediately preceding the current output segment.

In some implementations, the decoder neural network generates a respective reference segment encoding of each of the k most similar reference segments for each current output segment using an encoder neural network block, and the keys and values are derived from at least the respective reference segment encodings for the k most similar reference segments for the current output segments.

In some implementations, selecting k most similar reference segments from the set of reference segments to the current output segment using the respective reference segment embeddings and the respective current output segment embedding comprises: determining from the reference segment embeddings the k nearest neighbors to the current output segment embedding of the current output segment.

In some implementations, each reference segment in the set of reference segments includes an initial sub-segment and a continuation sub-segment that is a continuation of the initial sub-segment, and the respective reference segment embedding of each reference segment has been generated from the initial sub-segment of the reference segment using the embedding neural network.

In some implementations, the method further comprises, after using the decoder neural network to generate a final output token in the additional output segment that follows the current output sequence in the final output sequence: updating the current output sequence by concatenating the current output sequence and the additional output segment.

In some implementations, the method further comprises: generating the final output sequence by updating the current output sequence with the additional output segment, wherein updating the current output sequence with the additional output segment comprises appending the additional output segment to the end of the current output sequence.

In some implementations, there is provided a method performed by one or more computers and for training the decoder neural network, the method comprising: receiving training data that comprises multiple training examples, wherein each training example comprises a training network input, a training current output sequence that comprises one or more training current output segments and a training additional output segment that follows the training current output sequence in a corresponding target final output sequence; receiving a set of reference training segments, wherein the training reference segments comprise training current output segments from training current output sequences in the training data, training additional output segments from the target final output sequences in the training data, or both; for each training current output sequence, processing the training current output sequence and, for each of the one or more training current output segments in the training current output sequence, k most similar training reference segments to the training current output segment to generate a final output sequence; and training the decoder neural network, wherein the decoder neural network comprises a plurality of neural network parameters and wherein training the decoder neural network comprises updating the neural network parameters of the decoder neural network using the target final output sequences and the final output sequences generated by the decoder neural network.

In some implementations, the set of reference segments is the same as a set of training reference segments used to train the decoder neural network.

In some implementations, the set of reference segments is different from a set of training reference segments used to train the decoder neural network.

In some implementations, the embedding neural network is a pre-trained neural network, and the neural network parameters of the embedding neural network are not updated during the training of the decoder neural network.

In some implementations, the neural network parameters of the embedding neural network are updated during the training of the decoder neural network.

In some implementations, there is an initial decoder neural network that processes a network input and a current output sequence to generate a final output sequence and that does not include the encoder neural network block nor the one or more of the attention blocks in the sequence of attention blocks that each comprise a respective cross-attention neural network layer, and training the decoder neural network comprises: pre-training the initial decoder neural network; adding the encoder neural network block and the one or more attention blocks that each comprise a respective cross-attention neural network layer into the initial decoder neural network to generate the decoder neural network; and training the decoder neural network, wherein training the decoder neural network comprises updating only the neural network parameters of the encoder neural network block and the one or more of the attention blocks that each comprise a respective cross-attention neural network layer, while keeping the neural network parameters of the remainder of the decoder neural network static.

Particular embodiments of the subject matter described in this specification can be implemented so as to realize one or more of the following advantages.

The system described in this specification generates a final output sequence conditioned on a current output sequence that includes one or more current output segments and k most similar reference segments for each of the one or more current output segments in the current output sequence. Generating the final output sequence conditioned not only on the current output sequence but also on the k most similar reference segments for each of the current output segments in the current output sequence can enable the system to access greater context for the current output sequence than systems that process only a current output sequence. Enabling the system to have access to greater context for the current output sequence can enable the system to generate a more accurate and descriptive final output sequence (e.g., including additional detail from the greater context in a text sequence) compared with conventional systems that only process only the input sequence.

Additionally, by allowing the system to search through reference segments when generating a given output sequence, the system can achieve performance that matches or even exceeds that of systems that are significantly more computationally intensive but that do not make use of the reference segments. For example, the system can achieve comparable performance to conventional systems that have 25× or more neural network parameters than the system by making use of the reference segments. As a result, the system can be significantly cheaper (in terms of memory and latency) when deployed for performing inference relative to a comparably-performing, conventional system and can be trained by consuming significantly fewer computational resources than would be required to train the comparably-performing, conventional system.

Moreover, the system can make use of any of a variety of techniques to improve the computational efficiency of the training process, the inference process, or both while maintaining high performance.

As one example, the system can make use of a pre-trained embedding neural network, so that the training remains computationally efficient because gradients do need to be backpropagated into the embedding neural network during training. Moreover, the system can use the pre-trained embedding neural network to pre-compute embeddings of the segments in the training reference set at the outset of training, thereby making the search for the k nearest neighbors during training computationally efficient, e.g., by leveraging existing, high-performing k nearest neighbor or approximate k nearest neighbor search techniques.

As another example, when performing cross-attention, for each segment in the current sequence, the system can condition each output segment on the most similar reference segments for the previous output segment, i.e., rather than on the most similar reference segments for each output segment that has already been generated. This can significantly improve the computational efficiency of the generation process by reducing the number of attention computations that need to be performed while still maintaining high generation quality.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
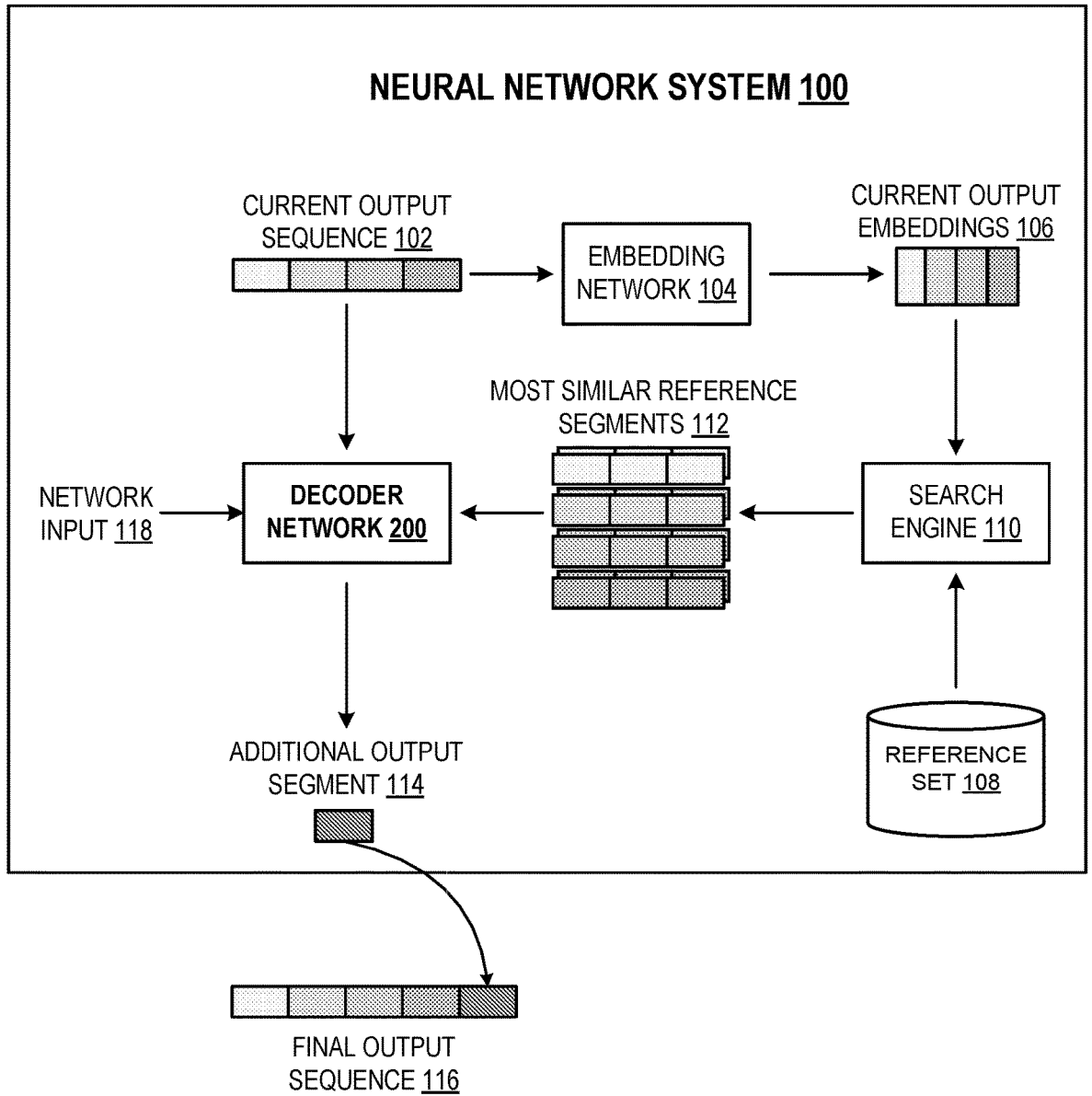
FIG. 1 is a block diagram of an example neural network system.

FIG. 1 shows an example neural network system 100. The neural network system 100 is an example of a system implemented as computer programs on one or more computers in one or more locations in which the systems, components, and techniques described below are implemented.

The neural network system 100 generates a final output sequence 116 that includes one or more output segments conditioned on a network input 118. In general an output segment can comprise one or more tokens in a vocabulary of tokens. In general, generation of the final output sequence is supported by a set of reference segments, e.g., of a similar format to an output segment. The neural network system receives a network input; in general this comprises data that is processed by the system to generate the final output sequence. In some implementations the network input can comprise one or more tokens, e.g., as a prompt.

The system 100 can be configured to generate any of a variety of types of final output sequences 116, i.e., to perform any of a variety of types of machine learning tasks.

As one example, the task can be a neural machine translation task. For example, if the network input to the neural network is a sequence of text, e.g., a sequence of words, phrases, characters, or word pieces, in one language, the final output sequence generated by the neural network can be a translation of the sequence of text into another language, i.e., a sequence of text in the other language that is a translation of the input sequence of text. As a particular example, the task can be a multi-lingual machine translation task, where a single neural network is configured to translate between multiple different source language—target language pairs. In this example, the source language text can be augmented with an identifier that indicates the target language into which the neural network should translate the source language text. The reference segments can include data representing examples of text in a target language for the translation.

As another example, the task can be a speech recognition task. For example, if the network input to the neural network is a sequence representing a spoken utterance, the final output sequence generated by the neural network can be a sequence of text in a natural language that is a transcription of the spoken utterance in the natural language. The sequence representing a spoken utterance can be an audio signal, or acoustic features derived from the audio signal. The reference segments can include data representing examples of text, e.g., natural language as used when spoken.

As another example, the task can be a text to speech generation task. For example, if the network input to the neural network is a text sequence in a natural language, the final output sequence generated by the neural network can represent a spoken utterance of the text sequence in the natural language. The sequence representing a spoken utterance can be an audio signal, or acoustic features derived from the audio signal. The reference segments can include data representing examples of audio signals or acoustic features.

As another example, the task can be a text generation task, where the network input is a sequence of text, and the final output sequence is another sequence of text, e.g., a completion of the input sequence of text, a response to a question posed in the input sequence, or a sequence of text that is about a topic specified by the first sequence of text. Thus, for example, the system can be deployed as part of a question-answering system that answers queries from users or as part of a dialogue system that corresponds with users. As another example, the network input to the text generation task can be an input other than text, e.g., an image, e.g., in the form of data representing the values of pixels of the image, and the final output sequence can be text that describes the network input. As yet another example, the network input to the text generation text can be a placeholder input and the system can generate the final output sequence conditioned on the placeholder input, i.e., the task is an unconditional task generation task. In such cases the reference segments can include data, e.g., representing examples of text, for use in generating the text.

In general, for the tasks described herein the task can be a response generation task, where the network input can include an input prompt of a user, e.g., in a natural language, and the final output sequence can represent a response to the input prompt of the user, e.g., in the natural language. As one example, in such implementations the input prompt from the user may be received in the form of spoken natural language (text) at a mobile phone or smart speaker, and the final output sequence representing response may be provided to the user as spoken natural language (text).

As another example, the task can be an image generation task, where the network input is a conditioning input and the final output sequence is a sequence of intensity values for the pixels of an image. The network input representing a conditioning input can characterize the generated image, e.g., it can represent, e.g., a type of object class that should be in the image represented by the final output sequence. In one example, the type of object class can be a species of animal, e.g., a dog, a whale, or a pterodactyl. In another example, the network input can represent a style filter that should characterize the image represented by the final output sequence, e.g., a grayscale filter, or a sepia filter. In yet another example, the network input can represent a painting style that should characterize the image, e.g., realism, impressionism, or cubism; or the style of a particular painter, e.g., van Gogh, Picasso, Da Vinci, or Monet. The reference segments can comprise data, e.g., representing pixels of an image, for use in generating the image.

As another example, the task can be a computer code generation task and the system generates final output sequences that represent sequences of computer code (e.g., in a computer programming language). In some implementations, the task can involve receiving a natural language description of desired computer code, and in response, generating a sequence of computer code that fits the natural language description of the desired computer code. In some implementations, the task can involve receiving a network input that is an input sequence of computer code, and in response, generating a final output sequence of computer code that is a completion of the input sequence of computer code (e.g., that logically extends the input sequence of computer code).

As another example, the task can be generating diagnoses, e.g., medical diagnoses as a part of an automatic diagnostic system, e.g., a medical diagnostic system. The network input can characterize input, e.g., from a user such as a doctor, detailing the health of an entity, e.g., a user such as a human or animal patient, or a machine. The (final) output sequence can represent diagnosis for the entity, e.g., a medical diagnosis for the user (patient) or a diagnosis of a fault in the machine, e.g., in a natural language. For example, the user input can include current health symptoms, pre-existing conditions, medications, and so on. The network input can be in the form of natural language, e.g., captured using a keyboard or voice-based user interface. In general the network input comprises physiological measurements that are processed by the system (according to the method) to provide a medical diagnosis. In general such physiological measurements may comprise laboratory test results and readings or measurements from medical devices, e.g., body temperature readings. The medical diagnosis may be any of one or more diagnoses based on, e.g., the data used to train the system, including any adverse health event such as (merely as examples): identification that a patient should be examined by a doctor or other medically qualified person, identification of acute kidney injury, identification of sepsis, identification of a patient health deterioration event, identification of an abnormal physiological sign, identification of a need for (re)admission to a medical care facility, identification that a patient can be discharges from a medical care facility, identification of that a patient should be admitted to an intensive care unit, identification of a risk of mortality, and so forth. The (final) output sequence can represent words in a natural language, e.g., as displayed text or spoken words. The output sequence can be generated as part of a conversation with the user relating to the user's health. For example in implementations the network input may comprise a sequence of tokens representing words, and the output sequence may comprise a sequence of tokens representing words generated in response, as part of a dialog between the user and the system, e.g., where the system is autoregressive. The reference segments can comprise data, e.g., in a natural language or other format, that support generation of the final output sequence representing the diagnosis, e.g., in the natural language.

In another example, the task can be an audio generation task, where network input is a conditioning input and the final output sequence is a sequence of notes in a song, and the neural network can be part of a music generation system. The network input can be, e.g., the first few notes of the song. In general in such an implementation the conditioning input defines one or more characteristics of the song that is generated. The reference segments can comprise data, e.g., representing musical notes, for use in generating the song.

In another example, the task be a narrative generation task, where the final output sequence can include a text sequence that represents a narrative story, and the neural network can be part of a story generation system.

The neural network system 100 can generate the final output sequence by repeatedly updating a current output sequence (e.g., current output sequence 102) of the final output sequence 116, so that the current output sequence 102 represents a "snapshot" of the final output sequence (i.e., a subsequence of the final output sequence at a current point in time, that is, after a particular update iteration). The neural network system 100 can autoregressively generate each of one or more output tokens in the final output sequence 116, so that the current output sequence includes each output token previously generated by the neural network system 100. At the beginning of processing, the final output sequence 116 can include, e.g., at least a sequence start token.

For example, the neural network system can repeatedly generate an additional output segment (e.g., additional output segment 114) that follows the current output sequence 102 in the final output sequence 116, and then add the additional output segment to the end of the current output sequence 102. Each additional output segment 114 can include one or more output tokens, e.g., 32, 64, or 128 output tokens, where each output token is selected from a vocabulary of output tokens. Once added to the current output sequence 102, the additional output segments can represent current output segments in the current output sequence.

For example, the vocabulary of output tokens can include output tokens representing characters (e.g., letters, or pictograph characters), word fragments, words, special separator tokens, punctuation tokens, or any combination of these. In one example, the output tokens can represent characters, word fragments, words, or any combination of these from human languages (e.g., English, Korean, etc.). In another example, each output token can represent a code symbol from a vocabulary of code symbols, e.g., from coding languages, such as C, C++, Python, etc. In another example, each output token can represent a musical symbol from a vocabulary of musical symbols (e.g., different notes, different length rests, etc.). In yet another example, the output tokens can represent other symbols imbued with semantic meaning in a consistent manner.

The neural network system generates the final output sequence 116 conditioned on the network input 118.

In some implementations, the neural network system 100 can add the network input 118 to the beginning of the final output sequence 116 as a "prompt", so that the final output sequence is a continuation or response to the prompt. That is, the network input 118 may comprise a sequence of tokens, e.g., from the same vocabulary as the output tokens. In cases where the neural network system 100 autoregressively generates each output token in the final output sequence, the current output sequence 102 can include the network input 118 and any output tokens in the final output sequence that have already been generated. In one example, the network input can represent an input prompt of a user, and the final output sequence can represent a response to the input prompt.

In some implementations, the neural network system 100 can process the network input separately using an encoder neural network to generate a respective encoded representation of the network input. The neural network system can process the current output sequence 102 and the encoded representation of the network input. In one example, the network input can represent a text sequence in one language, and the final output sequence can represent a translation of that text sequence in another language.

The neural network system 100 can autoregressively generate each output token in the additional output segment 114 by processing the current output sequence 102 and any output tokens in the additional output segment preceding the output token. The current output sequence 102 can include one or more current output segments that each include a same number of output tokens (e.g., 32, 64, or 128 output tokens), and a final output segment that includes the output tokens preceding the current output token in the additional output segment. The final current output segment can include the same number of output tokens as each previous current output segment, or a lesser number of output tokens, e.g., if the system generates an end sequence token, or a predetermined total number of output tokens is generated.

For each current output segment in the current output sequence 102, the neural network system can determine k most similar reference segments for the current output segment. The system can process the current output sequence 102, the most similar reference segments for each current output segment (e.g., most similar reference segments 112), and the final output segment including the already generated output tokens in the additional output segment 114 to generate the current output token, as is described below.

The neural network system 100 includes an embedding network 104, a reference set (of segments and/or reference segment embeddings) 108, search engine 110, and decoder network 200, which are each described in further detail below.

The embedding network 104 is a neural network that is configured to process each current output segment in the current output sequence 102 to generate a respective current output embedding of the current output segment (e.g., current output embeddings 106). For example, the current output segments can each include one or more respective output tokens, and the current output embeddings can be represented by, e.g., a collection of ordered numerical values, such as a vector or matrix of numerical values.

The embedding network 104 can have any appropriate neural network architecture that enables it to perform its described function, i.e., processing a current output segment to generate a respective embedding of the current output segment. In particular, the embedding neural network can include any appropriate types of neural network layers (e.g., fully-connected layers, attention-layers, convolutional layers, etc.) in any appropriate numbers (e.g., 1 layer, 5 layers, or 25 layers), and connected in any appropriate configuration. In a particular example, the embedding neural network can be a Bidirectional Encoder Representations from Transformers (BERT) neural network that is configured, for each current output segment, to process each of the one or more output tokens in the current output segment to generate a respective encoding of the output token. The embedding neural network 104 can generate the current output embedding for the current output segment as the respective encodings averaged over time. That is, the current output embedding can be determined as the average of the respective encodings of the output tokens in the current output segment. Examples of Bidirectional Encoder Representations from Transformers ("BERT") are described in more detail with reference to: Jacob Devlin, et al., "BERT: Pre-training of Deep Bidirectional Transformers for Language Understanding," arXiv:1810.04805v2, 24 May 2019, which is incorporated herein by reference.

The reference set 108 can include multiple reference segments and a respective reference segment embedding of each of the multiple reference segments. Each reference segment can include an initial sub-segment and, optionally, a continuation sub-segment that represents a continuation of the initial sub-segment in a larger token segment that provides additional context for the initial sub-segment. That is, the continuation sub-segment can be a sub-segment of the reference segment that follows the initial sub-segment in the reference sub-segment. The respective reference segment embedding of each reference segment can be determined from the initial sub-segment of the reference segment. Each respective reference segment embedding can be represented by, e.g., an ordered collection of numerical values, such as a vector or matrix of numerical values.

For example, the embedding network 104 can process the initial sub-segment of each reference segment to generate the respective reference segment embedding, e.g., as described above with respect to processing the current output segments to generate the current output embeddings. The reference segment embedding of the initial sub-segment can represent, e.g., a "key" to characterize the respective reference segment (i.e., the entire reference segment, including the initial sub-segment and the continuation sub-segment). For each current output segment, the search engine 110 can process the respective current output segment embedding and the respective keys (i.e., the respective reference segment embeddings) for the reference segments to select k most similar reference segments for the current output segment, as described below.

For example, neural network system 100 can be trained using initial sub-segments of a fixed length, e.g., 64 reference tokens, to determine the respective keys, and the length of the continuation sub-segments can be varied during inference depending upon the application, e.g., 0, 64, or 128 reference tokens. In one example, continuation sub-segments with the same number of reference tokens or more reference tokens than the initial sub-segment can be used for applications that required greater context in the reference segments, e.g., narrative text generation. In another example, in applications that do not require greater context, the reference sub-segments do not need to include continuation sub-segments, e.g., short answers or a yes/no answers to input prompts.

In one example, the reference segment embeddings can be generated before processing the current output sequence 102 (e.g., during inference to accelerate retrieval, or during training to accelerate training the decoder neural network 200, as described below). In another example, the reference segment embeddings can be generated during processing the current output sequence (e.g., during inference with a small reference set 108, or with a dynamic reference set 108 that is updated after processing N current output sequences).

For example, the reference segment can represent a text sequence, where the initial sub-segment includes the initial text in the text sequence, and the continuation sub-segment can include any remaining text that follows the initial text in the text sequence.

Each reference segment can include, e.g., one or more respective reference tokens from a vocabulary of reference tokens. In one example where the reference segment includes only the initial sub-segment, the initial sub-segment can include the one or more reference tokens in the reference segment. In another example where the reference segment includes both the initial sub-segment and the continuation sub-segment, the reference tokens can be distributed among the neighbor and continuation sub-segments such that the continuation sub-segment is a continuation of the initial sub-segment in the reference segment. In a particular example, the reference tokens can be distributed evenly, such that each of the neighbor and continuation sub-segments has n reference tokens, such as 32, 64, or 128 reference tokens. In another example, the reference tokens can be distributed unevenly, such that each initial sub-segment has a positive integer n number of reference tokens, and the corresponding continuation sub-segment has a positive integer m number of reference tokens, where m>n, e.g., where n=64 and m=128.

For example, the vocabulary of reference tokens can include reference tokens representing characters (e.g., letters, or pictograph characters), word fragments, words, special separator tokens, punctuation tokens, or any combination of these. In one example, the reference tokens can represent characters, word fragments, words, or any combination of these from human languages (e.g., English, Korean, etc.). In another example, each reference token can represent a code symbol from a vocabulary of code symbols, e.g., from coding languages, such as C, C++, Python, etc. In another example, each output token can represent a musical symbol from a vocabulary of musical symbols (e.g., different notes, different length rests, etc.). In yet another example, the reference tokens can represent other symbols imbued with semantic meaning in a consistent manner.

The search engine 110 is configured to process the current output embeddings 106 and the reference set 108 to select k most similar reference segments 112 for each current output segment in the current output sequence 102. The search engine 110 can process each current output embedding of the current output embeddings 106 and the reference segment embeddings to select from the reference set 108 the k most similar reference segments to the corresponding current output segment. For example, for each current output segment, the search engine 110 can determine from the reference segment embeddings the k nearest neighbors (kNN) to the current output embedding of the current output segment using any appropriate distance metric, e.g., a Euclidean distance metric. In particular examples, the search engine can select 2, 5, or 10 most similar reference segments (e.g., using a kNN or approximate kNN algorithm) for each current output segment.

The decoder network 200 is configured to generate an additional output segment 114 by processing at least the current output sequence 102 and the most similar reference segments 112 for each current output segment in the current output sequence 102. The decoder neural network 200 can process the current output sequence 102 and the most similar reference segments 112 using a sequence of attention blocks to generate the additional output segment 114. For example, the additional output segment 114 can include one or more output tokens. The decoder neural network 200 can autoregressively generate each output token in the additional output segment 114 by processing the current output sequence 102, the most similar reference segments 112, and each output token that precedes the output token in the additional output segment, as is described in further detail below with reference to FIG. 2.

In implementations where the network input is processed separately by an encoder neural network to generate an encoded representation of the network input, the decoder neural network 200 can autoregressively generate each output token in the additional output segment 114 by processing the encoded representation of the network input, the current output sequence 102, the most similar reference segments 112, and each output token that precedes the output token in the additional output segment. For example, the decoder neural network 200 can include one or more conventional cross-attentional neural network blocks that receive a representation of the current output sequence 102, and cross-attend the representation with the encoded representation.

Generating the additional output segment 114 by processing the current output sequence 102 and the most similar reference segments 112 can enable the neural network system to generate the additional output segment with greater context for the current output sequence. The neural network system can use the greater context to generate a more accurate and more descriptive (e.g., including detail from the greater context of the most similar reference segments) additional output segment.

In some cases, the final output sequence can include multiple output segments. The neural network system 100 can autoregressively generate each output segment by processing an updated current output sequence and the k most similar reference segments for each output segment in the updated current output sequence. After generating each additional output segment, the neural network system 100 can update the current output sequence by appending the additional output segment to the current output sequence. The neural network system can generate each additional output segment until the neural network system 100 generates a final additional output segment in the final output sequence 116. That is, the final output sequence 116 may comprise the current output sequence and one or more of the additional output segments generated. While generating each output segment in the final output sequence, the system can autoregressively generate each output token in the output segment as described above.

The neural network system 100 can be trained over a series of training iterations using training data that includes a set of training output sequences and, optionally, a corresponding set of context inputs (e.g., corresponding input sequences, or input prompts). The neural network system 100 can be trained jointly (e.g., where both the embedding network 104 and decoder neural network 200 are trained concurrently at each training iteration), or trained in stages using pre-training (e.g., where the embedding network 104 is pre-trained and the decoder neural network is trained over a series of training iterations with the parameter values of the pre-trained embedding neural network 104 being frozen), as is described below with reference to FIG. 5.

Figure 2:
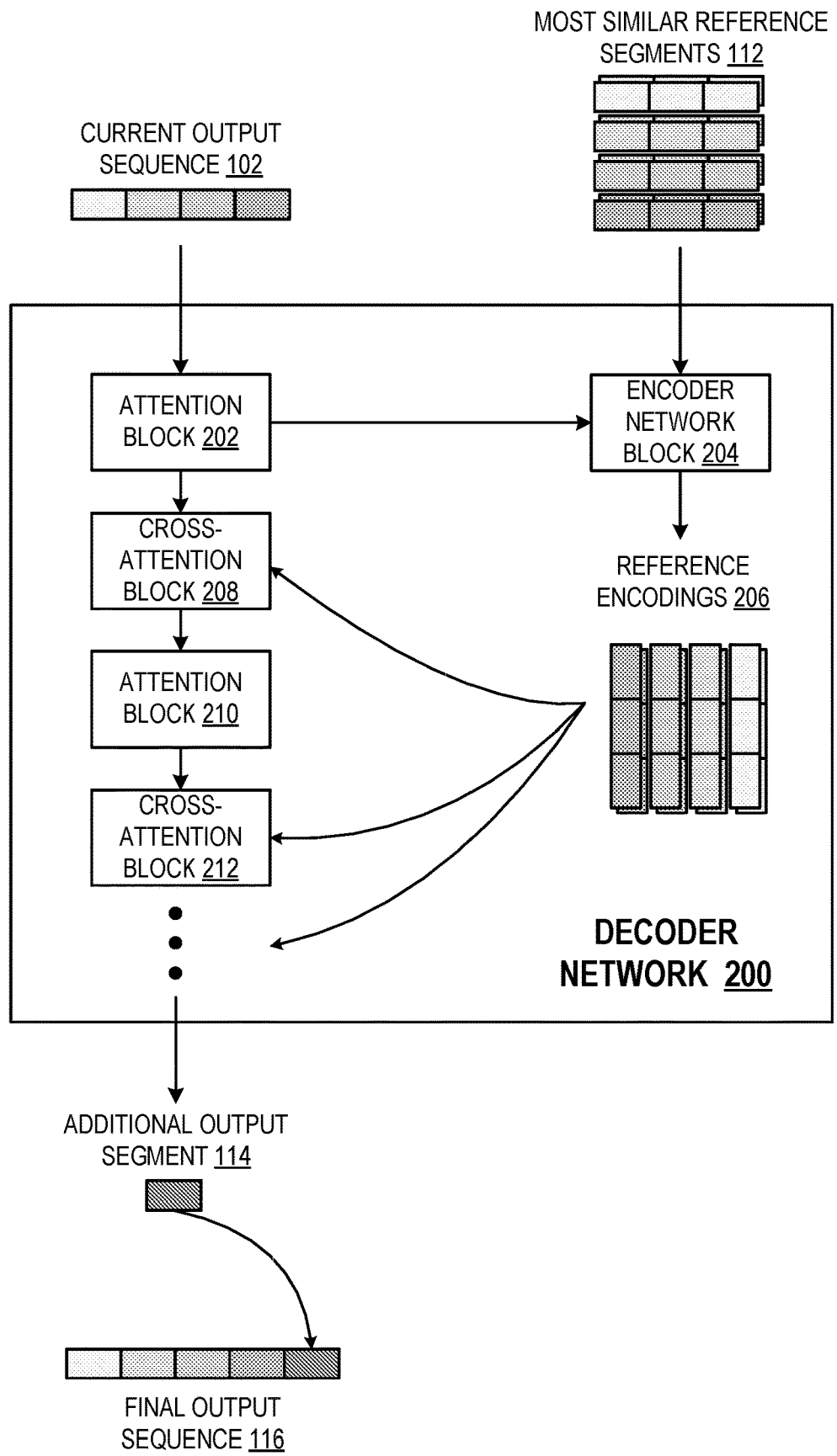
FIG. 2 is a block diagram of an example decoder neural network.

FIG. 2 shows an example decoder neural network 200. The decoder neural network 200 is an example of a system implemented as computer programs on one or more computers in one or more locations in which the systems, components, and techniques described below are implemented.

The decoder network is configured to process current output sequence 102 and most similar reference segments 112 to generate an additional output segment 114 that follows the current output sequence 102 in the final output sequence 116. The most similar reference segments 112 can include k most similar reference segments for each of one or more current output segments in the current output sequence 102. The additional output segment 114 can include one or more output tokens. For example, the current output sequence 102 can represent an input prompt from a user. The additional output segment can represent a response or part of a response to the input prompt, and the most similar reference segments can be selected from a set of reference segments, e.g., generated from a portion of a dataset, or the whole of the dataset.

During training, the reference set can be a training reference set. The training reference set can include one or more training examples used to train the neural network system, e.g., so that the training reference segments are the same as the training examples, or different from the training examples. The training examples can include training network inputs, training output segments from training output sequences, training additional output segments that follow the training current output sequences in corresponding target final output sequences. After training, the system can receive input from a user specifying what the reference set is, e.g., the reference set can be the same as the training reference set, or different from the training reference set.

The training data can be any data that is appropriate to the task being performed. For example, the dataset can include a general text corpus that includes text related to many different topics (e.g., historical information, sports information, news articles, fictional novels, plays, etc.), or can be customized for a downstream task. In one example, the dataset can be customized to the type of final output sequence, e.g., a dataset of short stories and novels for a final output sequence representing a narrative story, or a medical dataset for a final output sequence representing a medical diagnosis, e.g., expressed as text in a natural language and/or otherwise (e.g., as alphanumeric codes).

The decoder network 200 includes an encoder network block 204 and a sequence of attention blocks (e.g., attention block 202, cross-attention block 208, attention block 210, and cross-attention block 212), which are described in more detail below.

The sequence of attention blocks can include one or more attention blocks (e.g., attention block 202 and attention block 210) that process a block input generated from at least the current output sequence 102 to generate a block output, and one or more cross-attention blocks (e.g., cross-attention block 208 and cross-attention block 212) that process a block input generated from at least the current output sequence 102 and the reference encodings 206 to generate a block output.

For example, each attention block can include one or more respective self-attention neural network layers. Optionally, each attention block can also include one or more respective feedforward neural network layers. Each cross-attention block can include one or more respective cross-attention neural network layers. Optionally, each cross-attention block can also include one or more respective feedforward neural network layers, one or more self-attention neural network layers, or both. In one example, the attention blocks and cross-attention blocks can be interleaved so that every $N^{th}$ block is a cross-attention block (e.g., every other block, every $3^{rd}$ block, or every $5^{th}$ block). In another example, the sequence of attention blocks can have feedforward neural network layers interleaved among the sequence of attention blocks.

For example, each block input can include one or more block input segments (e.g., where each block input segment corresponds to a respective current output segment of the current output sequence 102), and each block output can include one or more block output segments (e.g., where each block output segment corresponds to a respective block input segment). Each block input segment can include a respective encoding of each output token in the corresponding current output segment (e.g., a collection of ordered numerical values, such as a vector or matrix of numerical values). Each block output segment can include a respective updated encoding of each output token in the corresponding current output segment, (e.g., a collection of ordered numerical values, such as a vector or matrix of numerical values).

The attention block 202 is configured to process a block input generated from the current output sequence 102 to generate a block output. The block output generated by the attention block 202 can be a block input for a next attention block in the sequence, e.g., cross-attention block 208.

In one example, the attention block 202 can include one self-attention neural network layer. The self-attention neural network layer can apply self-attention (i.e. an attention mechanism) to the block input segments for attention block 202 to generate a block output as a block input to the subsequent attention block (e.g., cross-attention block 208) and as input to the encoder network block 204. That is, in some implementations the encoder network block 204 is conditioned on data derived from the current output segment, which allows representations of the encoder network block 204 to be modulated by the current output segment that is being used to select the k most similar reference segments.

The encoder network block 204 is configured to process the block input segments from attention block 202 and the most similar reference segments 112 to generate reference encodings 206 of the most similar reference segments 112. The encoder network block 204 can apply cross-attention (i.e. an attention mechanism) using queries derived from the most similar reference segments and keys and values derived from the block input segments. In cases where the most similar reference segments include both initial sub-segments and continuation sub-segments, the encoder network block 204 can encode the full most similar reference segments. That is, the encoder network block 204 can process each initial sub-segment appended with the corresponding continuation sub-segment to generate the respective reference encoding.

For example, the encoder network block 204 can include a cross-attentional neural network layer. The cross-attentional neural network layer can use any appropriate positional encoding, e.g., relative positional encodings, rotary positional encodings, or absolute positional encodings. The encoder neural network block 204 determines the positional encodings for each most similar reference segment independently. The description below is an example that uses relative positional encodings.

The queries can be derived as, $$q_{u,j} = S_{u,j}(W_q)^T, \qquad (1)$$

where u indexes the current output segments, j indexes the most similar reference segments, $S_{u,j}$ represents the most similar reference segment j of current output segment u, $q_{u,j}$ represents the queries derived from $S_{u,j}$ (e.g., where each query corresponds to a respective reference token in $S_{u,j}$), $W_q$ represents a trainable matrix of query parameters for the cross-attention neural network layer, and $(.)^T$ represents the matrix transpose operator. The keys can be derived as, $$k_u = H_u(W_{k,H})^T, \qquad (2)$$

where $H_u$ represents the block input segment corresponding to current output segment u, $k_u$ represents the keys derived from $H_u$ (e.g., where each key corresponds to an output token in the current output segment u), and $W_{k,H}$ represents a trainable matrix of content-based key parameters for the cross-attention neural network layer. The values can be derived as, $$v_u = H_u(W_v)^T, \qquad (3)$$

where $v_u$ represents the values derived from $H_u$ (e.g., where each value corresponds to an output token in the current output segment u), and $W_v$ represents a trainable matrix of value parameters for the cross-attention neural network layer.

The encoder network block 204 can determine the relative position information for each most similar reference segment independently by computing relative position logits from distances between reference tokens i' in $S_{u,j}$ and the encodings of output tokens i in $H_u$ as $$R_{u,j}^{i',i} = r(d_{u,j}^{i',i}), \quad (4)$$

where r(.) can represent any appropriate position encoding function (e.g., such sine and cosine position encoding functions, as in a normal attention neural network layer), $R_{u,j}^{i',i}$ represents the relative position logit between the reference token i'∈[1, r] in $S_{u,j}$ (e.g., where each reference segment includes r reference tokens) and the encoding of output token i∈[1, m] in $H_u$ (e.g., where each current output segment includes m output tokens), and $d_{u,j}^{i',i}$ represents the relative distance between the reference token and the output token i, determined as, $$d_{u,j}^{i',i} = i' - i. \quad (5)$$

Using the relative position logits, the encoder network block 204 can determine the respective attention score between each query-key pair as, $$A_{u,j}^{i',i} = (q_{u,j}^{i'})^T k_u^i + (q_{u,j}^{i'})^T W_{k,R} R_{u,j}^{i',i} + u^T k_u^i + w^T k_u^i + w^T W_{k,R} R_{u,j}^{i',i}, \quad (6)$$

where $A_{u,j}^{i',i}$ represents the attention score between the query for reference token i' corresponding to most similar reference segment $S_{u,j}$ and the key for encoding of output token i corresponding to $H_u$, $q_{u,j}^{i'}$ represents the query for reference token i' corresponding to most similar reference segment j current output segment u, $k_u^i$ represents the key for output token i corresponding to current output segment u, $W_{k,R}$ represents a trainable matrix of position-based key parameters for the cross-attention neural network layer, and u and w represent trainable vectors of parameters for the cross-attention neural network layer.

The encoder network block 204 can determine the output from the cross-attention operation as a weighted sum of the values using the attention scores, as, $$C_{u,j} = f(A_{u,j}) v_u, \quad (7)$$

where $C_{u,j}$ represents the output from the cross-attention operation for most similar output segment j of current output segment u, $f(.)$ represents a softmax function (e.g., a masked-softmax function), $A_{u,j}$ represents an attention matrix for most similar segment j of current output segment u, and $v_u$ represents the values for current output segment u.

In some implementations, the encoder block 204 can further process the output $C_{u,j}$ using one or more normalization neural network layers and one or more feedforward neural network layers to generate the reference encoding of the most similar reference segment j for current output segment u.

For each most similar reference segment, the encoder network block 204 generating the reference encodings of the most similar reference segments by applying cross-attention with relative position encoding as in equations (1)-(6) can be summarized as, $$C_{u,j} = CA(S_{u,j}, H_u), \quad (8)$$

where u indexes the current output segments, j references the most similar reference segments, $S_{u,j}$ represents the most similar reference segment j of current output segment u, $C_{u,j}$ represents the reference encoding of $S_{u,j}$, and $H_u$ represents the block input segment corresponding to current output segment u. Examples of applying relative positional encodings are described in more detail with reference to: Zihang Dai, et al., "Transformer-XL: Attentive Language Models Beyond a Fixed-Length Context," arXiv:1901.02860, 2 Jun. 2019, which is incorporated herein by reference.

The cross-attention block 208 is configured to generate a block output by applying cross-attention to a block input (e.g., the block output from attention block 206) and the reference encodings 204. The block output can be a block input to a subsequent attention block in the sequence of attention blocks (e.g., attention block 210). For example, the cross-attention block can include one or more cross-attention neural network layers. The cross-attention neural network layers can apply cross-attention using queries derived from the block input segments and keys and values derived from the reference encodings 204.

In one example, the cross-attention block 208 can process each block input segment of the block input using only the reference encodings of most similar reference segments corresponding the previous block input segment immediately preceding the block input segment (i.e., for each current output segment, process the block input segment corresponding to the current output segment separately using the reference encodings corresponding to the block input segment for the previous current output segment).

The cross-attention block 208 can pass the first block input segment unaltered (that is, apply the identity to the first block input segment) since the first block input segment has no previous block input segment. For each subsequent block input segment, the cross-attention neural network layer can apply cross-attention using queries derived from the block input segment and keys and values derived from the reference encodings for the immediately preceding block input segment. In some examples, while still preserving causality, the key derived from the final encoding in the block input segment (e.g., the encoding of the final output token in the corresponding current output segment) can cross-attend to the keys and values derived from the reference encodings for the corresponding current output segment.

For example, the cross-attention block 208 can apply the cross-attention for each output token encoding in the block input segment using the method of equations (1)-(7), as $$z_{um+i-1} = CA(h_{um+i-1}, C_u), \quad (9)$$

where u indexes the current output segments, m represents the number of output tokens in current output segment u, i indexes the output tokens in the output segment following the current output segment u, $h_{um+i-1}$ represents the encoding of output token um+i−1, $z_{um+i-1}$ represents the updated encoding of the output token um+i−1, and $C_u$ represents a concatenation of the reference encodings (i.e., of the most similar reference segments) for current output segment u. Note that the −1 in the subscript of the updated encoding, $z_{um+i-1}$, and the encoding, $h_{um+i-1}$, as well as in equation (10) below, accounts for the final encoding in block input segment u cross-attending to the reference encodings for the current output segment u. In examples where the final encoding of block input segment u cross-attends to the reference encodings for the previous output segment u−1, the −1 can be omitted.

The relative positional logits for each reference encoding are determined independently as in equation (4) using a relative distance between the encoding of output token i∈[1, m] in $H_u$ and the reference encoding of reference token $i' \in [1, r]$ (e.g., where each reference segment includes r reference tokens), as $$d_{u,j}^{i',i} = i - i' + n - 1, \quad (10)$$

where $d_{u,j}^{i',i}$ represents the relative distance between the reference token i' in $C_{u,j}$ (i.e., reference encoding j for current output segment u) and the encoding of output token i in $H_u$. If the reference segment includes a continuation sub-segment, the n represents the length of the initial sub-segment. Otherwise, the n can be set to zero.

The process of applying cross-attention for ("conditioning") the block input segment for each current output segment on the most similar reference segments of the preceding current output segment immediately before the current output segment is illustrated with reference to FIG. 3.

In another example, the cross-attention block 208 can process each block input segment using the reference encodings of most similar reference segments of one or more of the current output segments in the current output sequence 102, e.g., using the most similar reference segments of every current output segment by applying equation (9) as, $$z_{u,i} = CA(h_{u,i}, C), \quad (11)$$

where u indexes the current output segments, i indexes the output tokens in the current output segment u, $h_{u,i}$ represents the encoding of output token i for current output segment u, $z_{u,i}$ represents the updated encoding of the output token i for current output segment u, and C represents a concatenation of the reference encodings for the current output segments. The relative positional encodings for each reference are determined independently as in equation (4) using a relative distance between the encoding of output token $i \in [1, m]$ in $H_u$ and the reference encoding of reference token $i' \in [1, r]$ (e.g., where each reference segment includes r reference tokens), as $$d_{u,j}^{i',i} = i - i' + n, \quad (12)$$

where $d_{u,j}^{i',i}$ represents the distance between the reference token i' in $C_{u,j}$ (i.e., reference encoding j for current output segment u) and the encoding of output token i in $H_u$. If the reference segment includes a continuation sub-segment, the n represents the length of the initial sub-segment. Otherwise, the n can be set to zero.

The attention block 210 is configured to process a block input generated from the current output sequence 102 to generate a block output, as described above with reference to attention block 206.

The cross-attention block 212 is configured to generate a block output by applying cross-attention to a block input (e.g., the block output from attention block 210) and the reference encodings 204, as described above with reference to cross-attention block 208.

The decoder neural network 200 can process an output from the sequence of attention blocks (e.g., a block output from a final attention block in the sequence of attention blocks) to generate the current output token in the additional output segment 114. For example, the decoder neural network 200 can process the representation of the most recently generated token as generated by the last block in the sequence of attention blocks to generate a set of scores, where each score corresponds to an output token in a vocabulary of output tokens. Then, the decoder neural network can select the output token corresponding to the largest score in the set of scores. In another example, the decoder neural network can sample an output token in accordance with the set of scores.

In some implementations, the decoder neural network 200 can be trained in stages. For example, an initial decoder neural network, e.g., the decoder network 200, can initially include only the attention blocks (e.g., attention blocks 202, 210) without the encoder network block 204 and the cross-attention blocks (e.g., cross-attention blocks 208, 212). The initial decoder neural network can be pre-trained to process the network input 118 and the current output sequence 102 and to generate the additional output segment 114. After the initial decoder neural network has been pre-trained, the encoder network block 204 and cross-attention blocks can be included into the initial decoder neural network to generate the decoder network 200. The encoder network block 204 and the cross-attention blocks in the decoder network 200 can be trained while the neural network parameters of the attention blocks remain static. For example, the attention blocks can be a part of another machine learning model, or the whole of another machine learning model, and the encoder network block 204 and the cross-attention blocks can be added to the machine learning model to enhance the performance of the original model.

Pre-training the attention blocks can enable the encoder network block 204 and the cross-attention blocks to be trained using many fewer training iterations than required to train the entire decoder network 200, thereby using fewer computational resources, e.g., memory, and floating point operations ("FLOPS"), while still maintaining high quality performance after training.

Figure 3:
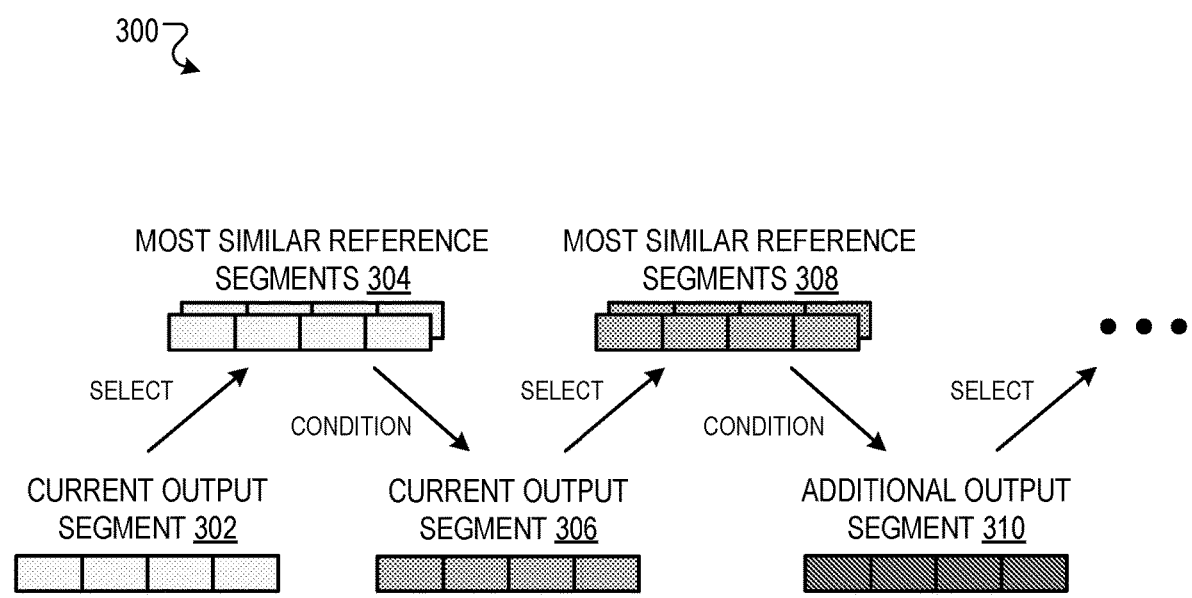
FIG. 3 illustrates conditioning each output segment on the most similar reference segments for the previous output segment.

FIG. 3 illustrates conditioning each output segment on the most similar reference segments for the previous output segment. The example conditioning is performed by a neural network system, e.g., the neural network system 100 of FIG. 1.

The neural network system generates an additional output segment (e.g., additional output segment 310) by processing a current output sequence that includes one or more current output segments (e.g., including current output segment 302 and a final current output segment 306) and k most similar reference segments for each current output segment in the current output sequence. The system can use a sequence of attention blocks to generate the additional output segment. The sequence of attention blocks can include one or more cross-attention blocks that apply across-attention using queries derived from the current output segments and keys and values derived from the most similar reference segments. That is, the cross-attention blocks can generate the additional output segment 310 by "conditioning" the current output sequence on the most similar reference segments for each current output segment in the current output sequence. In one example, for each current output segment, the cross-attention blocks can condition the current output segment on the most similar reference segments for the previous current output segment, as is described in further detail with respect to FIG. 2 above and illustrated in FIG. 3 as described below.

The neural network system can select the most similar reference segments 304 for the current output segment 302 (e.g., by finding k nearest neighbors from a set of reference segment embeddings to a current output segment embedding of the current output segment 302). The cross-attention blocks can condition the current output segment 306 on the most similar reference segments 304 for the current output segment 302 (i.e., the previous current output segment immediately prior to current output segment 306).

The neural network system can select the most similar reference segments 308 for the current output segment 306

(e.g., by finding k nearest neighbors from a set of reference segment embeddings to a current output segment embedding of the current output segment 302). The cross-attention blocks can condition the additional output segment 310 on the most similar reference segments 308 for the current output segment 306 (i.e., the final current output segment in the current output sequence and therefore the current output segment immediately prior to the additional output segment 310 in the final output sequence).

In some cases, the neural network system can autoregressively generate multiple additional output segments that follow the current output sequence in the final output sequence. That is, after generating each additional output segment, the neural network system can update the current output sequence to include the additional output segment. Then, the system can generate a next additional output segment following the additional output segment by processing the updated current output sequence and the k most similar reference segments for each current output segment in the updated output sequence.

For example, after generating the additional output segment 310, the neural network system can update the current output sequence to include the additional output segment 310 by appending the additional output segment 310 to the end of the current output sequence. Then, the system can generate a next additional output segment by processing the updated current output sequence and the k most similar reference segments for each current output segment. In one example, the system can select the k most similar reference segments for each current output segment, including for the additional output segment 310 (i.e., now the final current output segment of the output sequence). Then, the system can generate the next additional output segment by using the cross-attention blocks to condition the next additional output segment on the most similar reference segments for the additional output segment 310, condition the additional output segment 310 on the most similar reference segments 308 for current output segment 306, etc.

Figure 4:
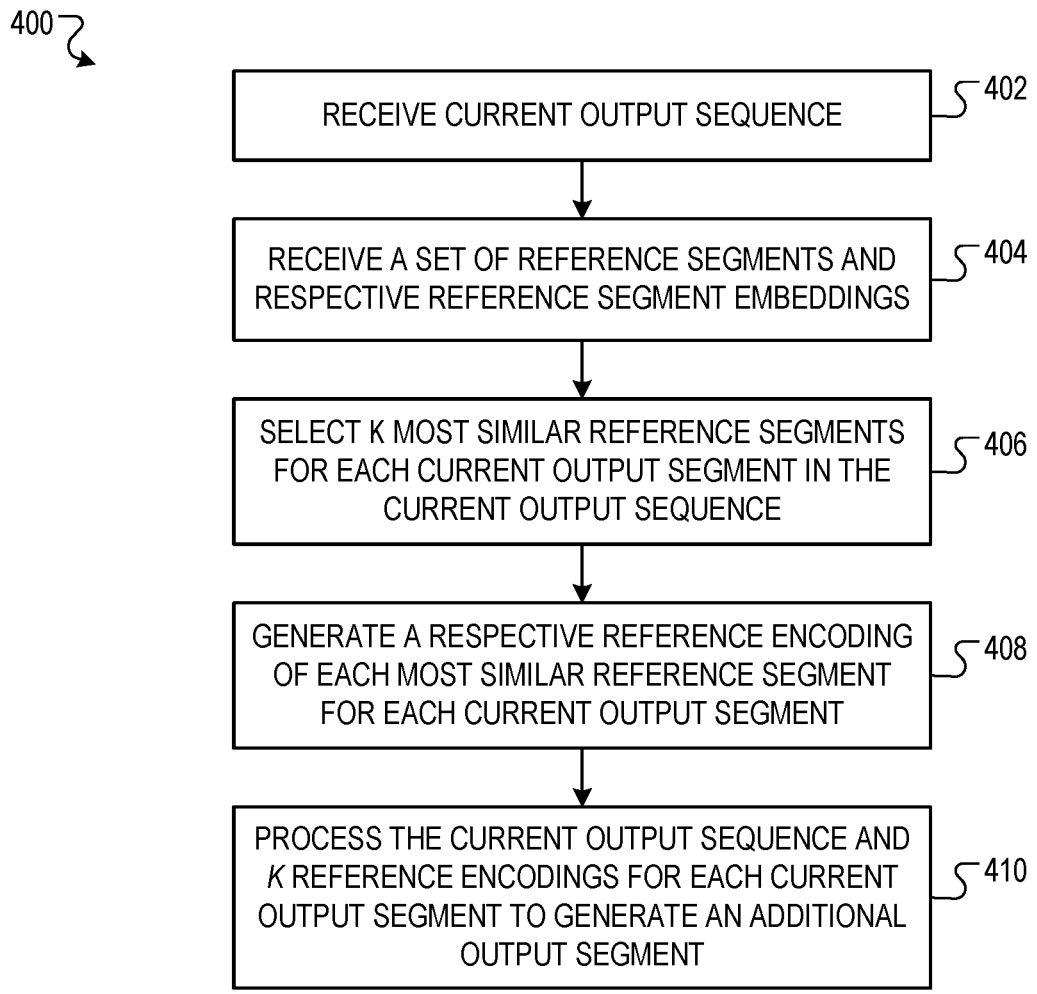
FIG. 4 is a flow diagram of an example process for generating an additional output segment in a final output sequence.

FIG. 4 is a flow diagram of an example process for generating an additional output segment in a final output sequence. For convenience, the process 400 will be described as being performed by a system of one or more computers located in one or more locations. For example, a neural network system, e.g., the neural network system 100 of FIG. 1, appropriately programmed in accordance with this specification, can perform the process 400.

The system can continue performing iterations of the process 400 to update the current output sequence as of the iteration until one or more stopping criteria are satisfied. For example, the stopping criteria can include generating a fixed number of output tokens, selecting an end of sequence token, or both, where the system ceases performing the iterations of the process 400 once one of the two stopping criteria have been satisfied.

The system can perform the process 400 as a part of a decoding strategy. For example, the decoding strategy can be a beam search strategy, where the system generates multiple candidate final output sequences. The system can provide one of the candidate final output sequences as the final output sequence (e.g., the candidate final output sequence having the highest aggregate likelihood, such as an aggregate over the likelihoods of the output tokens in the candidate final output sequence).

The system receives a current output sequence (402). The input sequence can include one or more current output segments. For example, the current output segments can each include one or more output tokens, where each output token is from a vocabulary of current output tokens.

The system receives a set of reference segments and respective reference segment embeddings (404). The respective reference segment embeddings can each correspond to a respective reference segment from the set of reference segments, and each can be generated using an embedding neural network, as described with respect to FIG. 2. For example, the embedding neural network can be a Bidirectional Encoder Representations from Transformers (BERT) neural network.

The system selects k most similar reference segments for each current output segment in the current output sequence (406). The system can determine the k most similar reference segments for each current output segment by processing the respective reference segment embeddings and a current output embedding of the current output segment generated using the embedding neural network. For example, to determine the k most similar reference segments for each current output segment, the system can determine from the reference segment embeddings the k nearest neighbors to the current output segment embedding of the current output segment.

The system generates a respective reference encoding of each most similar reference segment for each current output segment (408). The system can generate a respective reference encoding of each of the k most similar reference segments for each current output segment using an encoder neural network block. For example, the encoder neural network block can include a Bidirection Encoder Representations from Transformers (BERT) neural network.

The system processes the current output sequence and k reference encodings for each current output segment to generate an additional output segment that follows the current output sequence in a final output sequence (410). The additional output segment can include one or more output tokens, where each output token is selected from a vocabulary of output tokens.

For example, the system can autoregressively generate each output token in the additional output segment by processing a combined sequence (e.g., including the current output sequence and any output tokens preceding the output token in the additional output segment) and the k most similar segments for each current output segment. In one example, the system can autoregressively generate each output token in the additional output segment using a sequence of attention blocks. Each of one or more of the attention blocks can apply cross-attention on each current output segment in the combined sequence separately using the most similar reference segments for the preceding segment, as is described with reference to FIG. 2 and illustrated with reference to FIG. 3 above.

Figure 5:
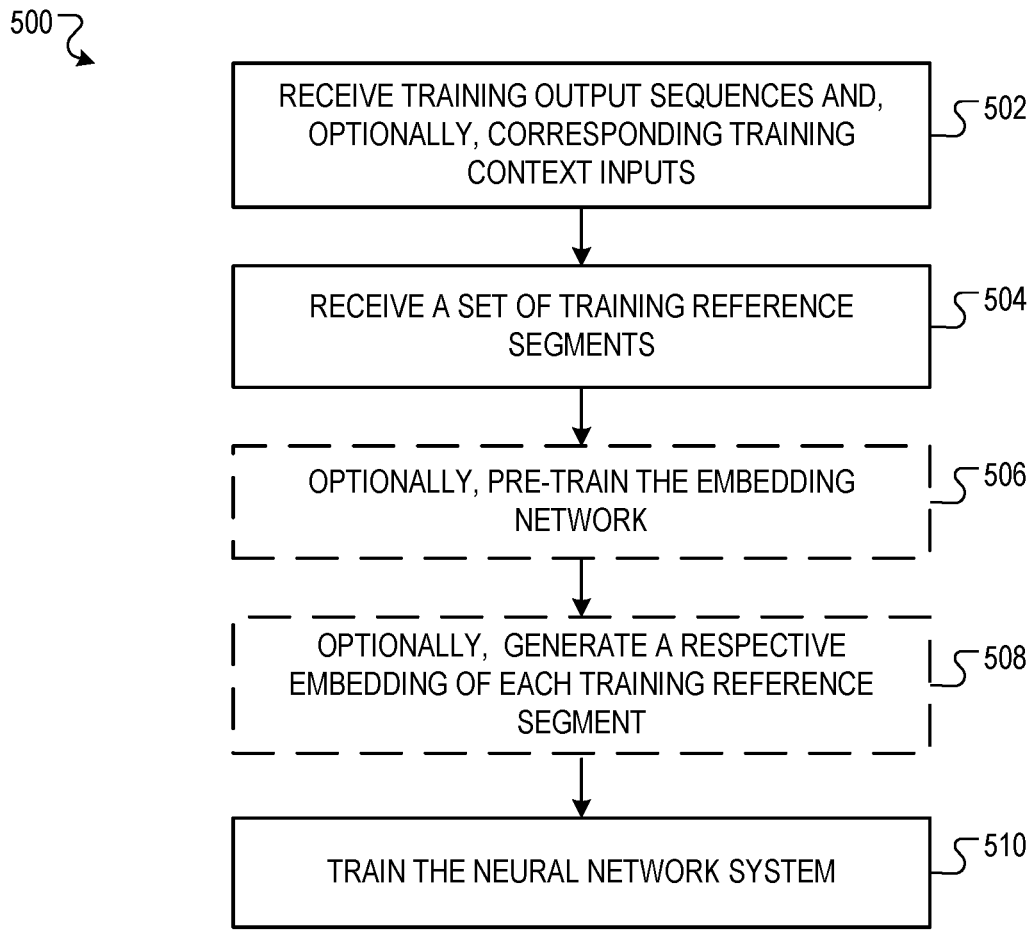
FIG. 5 is a flow diagram of an example process for training a neural network system.

FIG. 5 is a flow diagram of an example process for training a neural network system. For convenience, the process 500 will be described as being performed by a training system of one or more computers located in one or more locations.

The training system receives training output sequences and, optionally, corresponding training context inputs (502). Each training output sequence can include a training current output sequence that includes one or more training output segments and a target additional output segment that follows the training current output sequence in the training output sequence. Each target additional output segment can include, e.g., a respective ground truth output token at each of one or more output positions that follow the training current output sequence in the training output sequence, where each output token is selected from a vocabulary of output tokens. The corresponding training context inputs can include, e.g., corresponding training input sequences, or corresponding training input prompts.

For example, each training output sequence can represent a text sequence in a particular language. The optional corresponding training context input can include a training input sequence that, e.g., represents the text sequence in another language, and/or the optional training context input can include a training input prompt, e.g., from a user such that the text sequence is a response to the input prompt.

The training system receives a set of training reference segments (504). The training reference segments can include training network inputs, training output segments from the training output sequences, training additional output segments that follow training current output sequences in corresponding target final output sequences. During inference, the set of reference segments can be the same as the training reference segments, or the set of reference segments can be different from the set of training reference segments. For example, during training, the neural network system can be trained using a set of training reference segments that include output segments of the training output sequences. Then during inference the neural network system can use a reference set of reference segments selected by a user, e.g., a larger set of reference segments (e.g., selected from a subsection or the whole of a database), or a customized reference set for a downstream task.

For example, for a final output sequence that represents a text narrative, the customized reference set can include short stories and novels that the text narrative should emulate. In another example, for generating medical diagnoses in response to health input from a user, the customized reference set can include interactions between users and their health professionals, and/or lists of symptoms and corresponding diagnoses represented by alphanumerical medical diagnostic codes.

Optionally, the training system can pre-train the embedding network (506). The neural network system can be trained jointly, where both the embedding network and decoder neural network are trained concurrently at each training iteration, or trained in stages using pre-training. For example, the embedding network can be pre-trained (e.g., a pre-trained Bidirectional Encoder Representations from Transformers (BERT) neural network, e.g., trained to minimize the BERT loss). Then, the decoder neural network can be trained, with the neural network parameters of the embedding network being static during the training, e.g., during training step (510).

Optionally, the training system generates a respective embedding of each training reference segment (508). If the embedding network is pre-trained, the set of training reference segment embeddings can be predetermined, since neither the set of reference segments nor the embedding neural network parameters are changing during training. For example, the k nearest neighbors from the set of training reference segments for each training current output segment in the training sequences can be also pre-determined (e.g., pre-selected using a k nearest neighbors algorithm). Pre-determining the k nearest neighbors can enable the decoder neural network to be trained much more quickly and with fewer computational resources than training both the embedding network and the decoder network concurrently.

Pre-training the embedding neural network and pre-determining the k nearest neighbors can be enable the decoder neural network to be trained using larger data sets since the amount of computational resources consumed will be much lower than not pre-training the embedding neural network and pre-determining the k nearest neighbors.

The training system trains the neural network system (510). The neural network system can be trained over a series of training iterations. The neural network system can be trained jointly, where both the embedding network and decoder neural network are trained concurrently at each training iteration, or trained in stages using pre-training, as described above.

For example, if the neural network system is trained jointly, the neural network parameters of the embedding neural network can be updated at each training iteration with the neural network parameters of the decoder network, or every N training iterations (e.g., to provide stability in training the decoder neural network). In these cases, the set of training reference embeddings must be recalculated after each update to the neural network parameters of the embedding neural network.

The training system can train the neural network system using training data that includes the set of training output sequences and, optionally, the training context inputs.

For each training output sequence, the decoder neural network can process the training current output sequence and k most similar training reference segments for each of one or more of the training current output segments in the training current output sequence to generate a respective score distribution over the vocabulary of output tokens for each output position in the corresponding target additional output segment. For example, the encoder neural network can generate the score distribution for each output position using "teacher forcing." That is, the encoder neural network can generate the score distribution for the output position by processing the training current output sequence and any ground truth output tokens in the target additional output segment that precede the output position in the target output sequence.

For each target additional output segment, the neural network system can be trained using an objective function that measures for each output position in the target additional output segment an error between (i) the score distribution generated by the decoder neural network for the output position and (ii) a target score distribution generated from the ground truth output token for the output position (e.g., represented by a one-hot vector over the vocabulary of output tokens). The neural network system can be trained by determining a gradient of the objective function (e.g., using backpropagation) for each target additional output segment, and applying a function of the gradients to update the neural network parameter values of the neural network system using an appropriate gradient descent optimization technique, e.g., RMSprop or Adam. For example, the objective function can be a cross-entropy objective function. For example, the neural network system can be trained by applying an average of the gradients to update the neural network parameter values of the neural network system.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers and for generating a final output sequence, the method comprising:
   receiving a network input that comprises one or more prompt segments that are provided as input by a user;
   receiving a current output sequence comprising one or more current output segments;
   receiving a set of reference segments and, for each reference segment in the set, a respective reference segment embedding of the reference segment that has been generated from the reference segment using an embedding neural network;
   for each of the one or more current output segments in the current output sequence:
      processing the current output segment using the embedding neural network to generate a current output segment embedding of the current output segment; and
      selecting k most similar reference segments from the set of reference segments to the respective current output segment using the respective reference segment embeddings and the current output segment embedding; and
   processing the network input that comprises the one or more prompt segments that are provided as input by the user, the current output sequence, and the k most similar reference segments for each of the one or more current output segments of the current output sequence using a decoder neural network to generate an additional output segment that follows the current output sequence in the final output sequence, wherein the additional output segment of the final output sequence comprises one or more output tokens, wherein the decoder neural network autoregressively generates each output token of the additional output segment conditioned on the current output sequence, the k most similar segments of each current output segment, and any output tokens in the additional output segment that precede the output token by processing a combined sequence that comprises at least a concatenation of the current output sequence and the preceding output tokens using a sequence of attention blocks, and wherein each of one or more of the attention blocks in the sequence of attention blocks comprises a respective cross-attention neural network layer that applies cross-attention with queries derived from at least the current output segment and keys and values derived from at least the k most similar reference segments for each current output segment.

2. The method of claim 1, wherein the network input comprises an input sequence, and wherein the method further comprises:
   processing the input sequence using an encoder neural network to generate an encoded representation of the input sequence, and wherein processing the current output sequence and the k most similar reference segments for each of the one or more current output segments using the decoder neural network comprises:
   processing the current output sequence, the k most similar reference segments for each of the one or more current output segments, and the encoded representation of the input sequence.

3. The method of claim 1, wherein applying cross-attention with queries derived from at least the current output segments and keys and values derived from at least the k most similar reference segments for each current output segment comprises:
   for each current output segment in the current output sequence, applying cross-attention with queries derived from at least the current output segment and keys and values derived from at least the k most similar reference segments for each current output segment.

4. The method of claim 1, wherein applying cross-attention with queries derived from at least the current output segments and keys and values derived from at least the k most similar reference segments for each current output segment comprises:

for the first current output segment in the current output sequence, passing a representation of the first current output segment received by the cross-attention neural network layer unaltered; and for each current output segment in the current output sequence after the first current output segment, applying cross-attention with queries derived from at least the current output segment and keys and values derived from at least the k most similar reference segments for the previous current output segment in the current output sequence immediately preceding the current output segment.

5. The method of claim 1, wherein the decoder neural network generates a respective reference segment encoding of each of the k most similar reference segments for each current output segment using an encoder neural network block, and wherein the keys and values are derived from at least the respective reference segment encodings for the k most similar reference segments for the current output segments.

6. The method of claim 1, wherein selecting k most similar reference segments from the set of reference segments to the current output segment using the respective reference segment embeddings and the respective current output segment embedding comprises:

determining from the reference segment embeddings the k nearest neighbors to the current output segment embedding of the current output segment.

7. The method of claim 6, wherein each reference segment in the set of reference segments includes an initial sub-segment and a continuation sub-segment that is a continuation of the initial sub-segment, and wherein the respective reference segment embedding of each reference segment has been generated from the initial sub-segment of the reference segment using the embedding neural network.

8. The method of claim 1, further comprising, after using the decoder neural network to generate a final output token in the additional output segment that follows the current output sequence in the final output sequence:

updating the current output sequence by concatenating the current output sequence and the additional output segment.

9. The method of claim 1, further comprising:

generating the final output sequence by updating the current output sequence with the additional output segment, wherein updating the current output sequence with the additional output segment comprises appending the additional output segment to the end of the current output sequence.

10. The method of claim 1, wherein the decoder neural network has been trained by performing operations comprising:

receiving training data that comprises multiple training examples, wherein each training example comprises a training network input, a training current output sequence that comprises one or more training current output segments and a training additional output segment that follows the training current output sequence in a corresponding target final output sequence;

receiving a set of reference training segments, wherein the training reference segments comprise training current output segments from training current output sequences in the training data, training additional output segments from the target final output sequences in the training data, or both;

for each training current output sequence, processing the training current output sequence and, for each of the one or more training current output segments in the training current output sequence, k most similar training reference segments to the training current output segment to generate a final output sequence; and training the decoder neural network, wherein the decoder neural network comprises a plurality of neural network parameters and wherein training the decoder neural network comprises updating the neural network parameters of the decoder neural network using the target final output sequences and the final output sequences generated by the decoder neural network.

11. The method of claim 1, wherein the set of reference segments is the same as a set of training reference segments used to train the decoder neural network.

12. The method of claim 1, wherein the set of reference segments is different from a set of training reference segments used to train the decoder neural network.

13. The method of claim 1, wherein the embedding neural network is a pre-trained neural network, and wherein the neural network parameters of the embedding neural network are not updated during the training of the decoder neural network.

14. The method of claim 1, wherein the neural network parameters of the embedding neural network are updated during the training of the decoder neural network.

15. The method of claim 1, wherein an initial decoder neural network that processes a network input and a current output sequence to generate a final output sequence does not include the encoder neural network block, and wherein training the decoder neural network comprises:

pre-training the initial decoder neural network;

adding the encoder neural network block and one or more attention blocks that each comprise a respective cross-attention neural network layer into the initial decoder neural network to generate the decoder neural network; and training the decoder neural network, wherein training the decoder neural network comprises updating only the neural network parameters of the encoder neural network block and the one or more of the attention blocks that each comprise a respective cross-attention neural network layer, while keeping the neural network parameters of the remainder of the decoder neural network static.

16. A system comprising:

one or more computers; and one or more storage devices storing instructions that, when executed by the one or more computers, cause the one or more computers to perform operations for generating a final output sequence, the operations comprising:

receiving a network input that comprises one or more prompt segments that are provided as input by a user;

receiving a current output sequence comprising one or more current output segments;

receiving a set of reference segments and, for each reference segment in the set, a respective reference segment embedding of the reference segment that has been generated from the reference segment using an embedding neural network;

for each of the one or more current output segments in the current output sequence:

processing the current output segment using the embedding neural network to generate a current output segment embedding of the current output segment; and selecting k most similar reference segments from the set of reference segments to the respective current output segment using the respective reference segment embeddings and the current output segment embedding; and processing the network input that comprises the one or more prompt segments that are provided as input by the user, the current output sequence, and the k most similar reference segments for each of the one or more current output segments of the current output sequence using a decoder neural network to generate an additional output segment that follows the current output sequence in the final output sequence, wherein the additional output segment of the final output sequence comprises one or more output tokens, wherein the decoder neural network autoregressively generates each output token of the additional output segment conditioned on the current output sequence, the k most similar segments of each current output segment, and any output tokens in the additional output segment that precede the output token by processing a combined sequence that comprises at least a concatenation of the current output sequence and the preceding output tokens using a sequence of attention blocks, and wherein each of one or more of the attention blocks in the sequence of attention blocks comprises a respective cross-attention neural network layer that applies cross-attention with queries derived from at least the current output segment and keys and values derived from at least the k most similar reference segments for each current output segment.

17. One or more non-transitory computer-readable storage media storing instructions that when executed by one or more computers cause the one or more computers to perform operations for generating a final output sequence, the operations comprising:

receiving a network input that comprises one or more prompt segments that are provided as input by a user;

receiving a current output sequence comprising one or more current output segments;

receiving a set of reference segments and, for each reference segment in the set, a respective reference segment embedding of the reference segment that has been generated from the reference segment using an embedding neural network;

for each of the one or more current output segments in the current output sequence:
processing the current output segment using the embedding neural network to generate a current output segment embedding of the current output segment; and selecting k most similar reference segments from the set of reference segments to the respective current output segment using the respective reference segment embeddings and the current output segment embedding; and processing the network input that comprises the one or more prompt segments that are provided as input by the user, the current output sequence, and the k most similar reference segments for each of the one or more current output segments of the current output sequence using a decoder neural network to generate an additional output segment that follows the current output sequence in the final output sequence, wherein the additional output segment of the final output sequence comprises one or more output tokens, wherein the decoder neural network autoregressively generates each output token of the additional output segment conditioned on the current output sequence, the k most similar segments of each current output segment, and any output tokens in the additional output segment that precede the output token by processing a combined sequence that comprises at least a concatenation of the current output sequence and the preceding output tokens using a sequence of attention blocks, and wherein each of one or more of the attention blocks in the sequence of attention blocks comprises a respective cross-attention neural network layer that applies cross-attention with queries derived from at least the current output segment and keys and values derived from at least the k most similar reference segments for each current output segment.

18. The system of claim 16, wherein applying cross-attention with queries derived from at least the current output segments and keys and values derived from at least the k most similar reference segments for each current output segment comprises:

for each current output segment in the current output sequence, applying cross-attention with queries derived from at least the current output segment and keys and values derived from at least the k most similar reference segments for each current output segment.

19. The system of claim 16, wherein applying cross-attention with queries derived from at least the current output segments and keys and values derived from at least the k most similar reference segments for each current output segment comprises:

for the first current output segment in the current output sequence, passing a representation of the first current output segment received by the cross-attention neural network layer unaltered; and for each current output segment in the current output sequence after the first current output segment, applying cross-attention with queries derived from at least the current output segment and keys and values derived from at least the k most similar reference segments for the previous current output segment in the current output sequence immediately preceding the current output segment.

20. The system of claim 16, wherein the decoder neural network generates a respective reference segment encoding of each of the k most similar reference segments for each current output segment using an encoder neural network block, and wherein the keys and values are derived from at least the respective reference segment encodings for the k most similar reference segments for the current output segments.

21. The system of claim 16, wherein selecting k most similar reference segments from the set of reference segments to the current output segment using the respective reference segment embeddings and the respective current output segment embedding comprises:

determining from the reference segment embeddings the k nearest neighbors to the current output segment embedding of the current output segment.

* * * * *